(12) United States Patent
Gretz (10) Patent No.: US 7,381,088 B1
(45) Date of Patent: Jun. 3, 2008

(54) ELECTRICAL FITTING WITH INTERNAL CABLE RETAINER

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/707,582

(22) Filed: Feb. 16, 2007

(51) Int. Cl.
  *H01R 13/73* (2006.01)
(52) U.S. Cl. ...................... 439/557; 174/661
(58) Field of Classification Search ............... 439/557; 174/661, 663, 669
  See application file for complete search history.

(56) References Cited

U.S. PATENT DOCUMENTS

| 2,540,999 | A |   | 2/1951  | Thomas, Jr. |         |
|-----------|---|---|---------|-------------|---------|
| 2,577,748 | A |   | 12/1951 | Gillespie   |         |
| 2,639,927 | A |   | 5/1953  | Billeter    |         |
| 2,973,212 | A |   | 2/1961  | Rose        |         |
| 5,373,106 | A | * | 12/1994 | O'Neil et al. | 174/669 |
| 5,594,209 | A |   | 1/1997  | Nattel et al. |       |
| 5,731,543 | A |   | 3/1998  | Jorgensen   |         |
| 6,034,326 | A | * | 3/2000  | Jorgensen   | 174/660 |
| 6,133,529 | A | * | 10/2000 | Gretz       | 174/656 |
| 6,335,488 | B1|   | 1/2002  | Gretz       |         |
| 6,352,439 | B1| * | 3/2002  | Stark et al.| 439/142 |
| 6,444,907 | B1|   | 9/2002  | Kiely       |         |
| 6,555,750 | B2| * | 4/2003  | Kiely       | 174/657 |
| 6,682,355 | B1| * | 1/2004  | Gretz       | 439/98  |
| 6,957,968 | B1| * | 10/2005 | Gretz       | 439/92  |
| 7,057,107 | B2| * | 6/2006  | Auray et al.| 174/659 |
| 7,214,890 | B2| * | 5/2007  | Kiely et al.| 174/666 |

* cited by examiner

*Primary Examiner*—Thanh-Tam T Le (57) ABSTRACT

An electrical fitting having an improved arrangement on the trailing end for securing electrical cables thereto. A connector body having a cavity in the trailing end includes a cable retainer secured therein. The cable retainer includes a substantially tubular body and is constructed of spring steel. The tubular body includes a flat portion and an arcuate portion. A single cable retaining tang extends inwardly from the flat portion. Providing the cable retaining tang on the flat portion of the tubular body enables a straight bend line between the cable retaining tang and the tubular body, thereby allowing the tang to flex easily. The cable retaining tang includes a wide cable gripping surface to enable secure gripping of an electrical cable as it is inserted within the trailing end of the fitting.

14 Claims, 8 Drawing Sheets

ELECTRICAL FITTING WITH INTERNAL CABLE RETAINER

FIELD OF THE INVENTION

This invention relates to fittings for connecting electrical cables to a panel and specifically to an electrical fitting having an improved arrangement on the trailing end for receiving an electrical cable or conduit.

BACKGROUND OF THE INVENTION

Electrical fittings are commonly used to connect electrical cables to electrical panels or boxes. In recent years, snap fit electrical fittings have become increasingly popular.

Several prior art connectors have been proposed for the attachment of electrical cables or conduits to panels or electrical boxes. Some of these, such as that shown in U.S. Pat. No. 6,335,488 to Gretz, include a tubular body with a cavity on the trailing end and a cylindrical-shaped split ring that is inserted into the cavity. The prior art split ring included a plurality of cable gripping tangs extending inwards of the cylindrical ring for securing a cable to the trailing end of the connector. Although the prior art split ring adequately performed the function of gripping a cable, as a result of the multiple tangs, the electrical fitting was mechanically complex and relatively expensive to produce.

The present invention provides an electrical fitting that includes an improved cable-retaining ring that is of simpler construction than those described in the prior art. The cable-retaining ring of the present invention is of simpler construction, with a single tang for gripping and holding an inserted cable. As a result of the simpler construction of the cable-retaining ring, the electrical fitting of the present invention is easier to manufacture and cheaper to produce than prior art internal cable retaining rings. The cable-retaining ring of the present invention includes several features that enable it to easily flex while securely gripping and holding an electrical cable for the purpose of connecting it to a panel or an electrical box.

SUMMARY OF THE INVENTION

The invention is an electrical fitting having an improved arrangement on the trailing end for securing electrical cables thereto. A connector body having a cavity in the trailing end includes a cable retainer secured therein. The cable retainer includes a substantially tubular body and is constructed of spring steel. The tubular body includes a flat portion and an arcuate portion. A single cable retaining tang extends inwardly from the flat portion. Providing the cable retaining tang on the flat portion of the tubular body enables a straight bend line between the cable retaining tang and the tubular body, thereby allowing the tang to flex easily. The cable retaining tang includes a wide cable gripping surface to enable secure gripping of an electrical cable as it is inserted within the trailing end of the fitting.

OBJECTS AND ADVANTAGES

Several advantages are achieved with the electrical fitting of the present invention, including:

(1) The electrical fitting includes a cable retainer that is of simplified construction, with a single cable retaining tang projecting inward from the tubular body of the cable retainer. The simplified construction enables the electrical fitting to be easily manufactured at an economical cost.

(2) The cable retaining tang of the electrical fitting projects from a flat portion of the cable retainer and includes a straight bend line to enhance the flexibility of the tang and thereby enabling easy insertion of electrical cables within the trailing end of the connector body.

(3) The cable retaining tang is of greater width and includes a wider cable gripping surface, thereby improving the ability of the electrical fitting to securely grip electrical cables therein.

These and other objects and advantages of the present invention will be better understood by reading the following description along with reference to the drawings.

| INDEX TO REFERENCE NUMERALS IN DRAWINGS | |
|---|---|
| 20 | electrical fitting, preferred embodiment |
| 22 | connector body |
| 24 | leading end |
| 26 | trailing end |
| 28 | fastening arrangement |
| 30 | snap ring |
| 32 | cable retainer |
| 34 | central flange |
| 36 | end flange |
| 38 | cavity |
| 40 | wall |
| 42 | partial closure |
| 44 | opening in partial closure |
| 46 | edge of partial closure |
| 47 | opening in surrounding wall |
| 48 | snap ring blank |
| 50 | panel engagement tang |
| 52 | grounding tang |
| 54 | cable retainer blank |
| 56 | first end |
| 58 | second end |
| 60 | lateral bend line |
| 62 | first bend line |
| 63 | bend line |
| 64 | second bend line |
| 66 | tubular body of cable retainer |
| 68 | flat portion |
| 70 | cable retaining tang |
| 72 | locking tang |
| 74 | tab |
| 76 | groove |
| 78 | proximate end of cable retaining tang |
| 80 | distal end of cable retaining tang |
| 82 | longitudinal axis |
| 84 | first leg |
| 86 | second leg |
| 88 | side edges of cable retaining tang |
| 90 | U-shaped notch |
| 92 | end portion of cable retaining tang |
| 94 | arcuate edge |
| 96 | flat edge |
| 98 | insert |
| 100 | end flange of insert |
| 102 | smooth seat |
| 104 | nose section of insert |
| 106 | center bore of insert |
| 108 | securing arrangement |
| 110 | aperture in panel |
| 112 | panel |
| 114 | electrical fitting, alternative embodiment |
| 116 | fastening arrangement, alternative embodiment |
| 118 | threads |
| 120 | leading end |
| 122 | connector body, alternative embodiment |
| 124 | nut |
| 126 | electrical cable |
| D1 | width of single cable retaining tang |
| D2 | inner diameter of cable retainer |
| θ | angle of first leg with respect to longitudinal axis |
| θ1 | angle of second leg with respect to first leg |

DETAILED DESCRIPTION OF THE INVENTION

Figure 1:
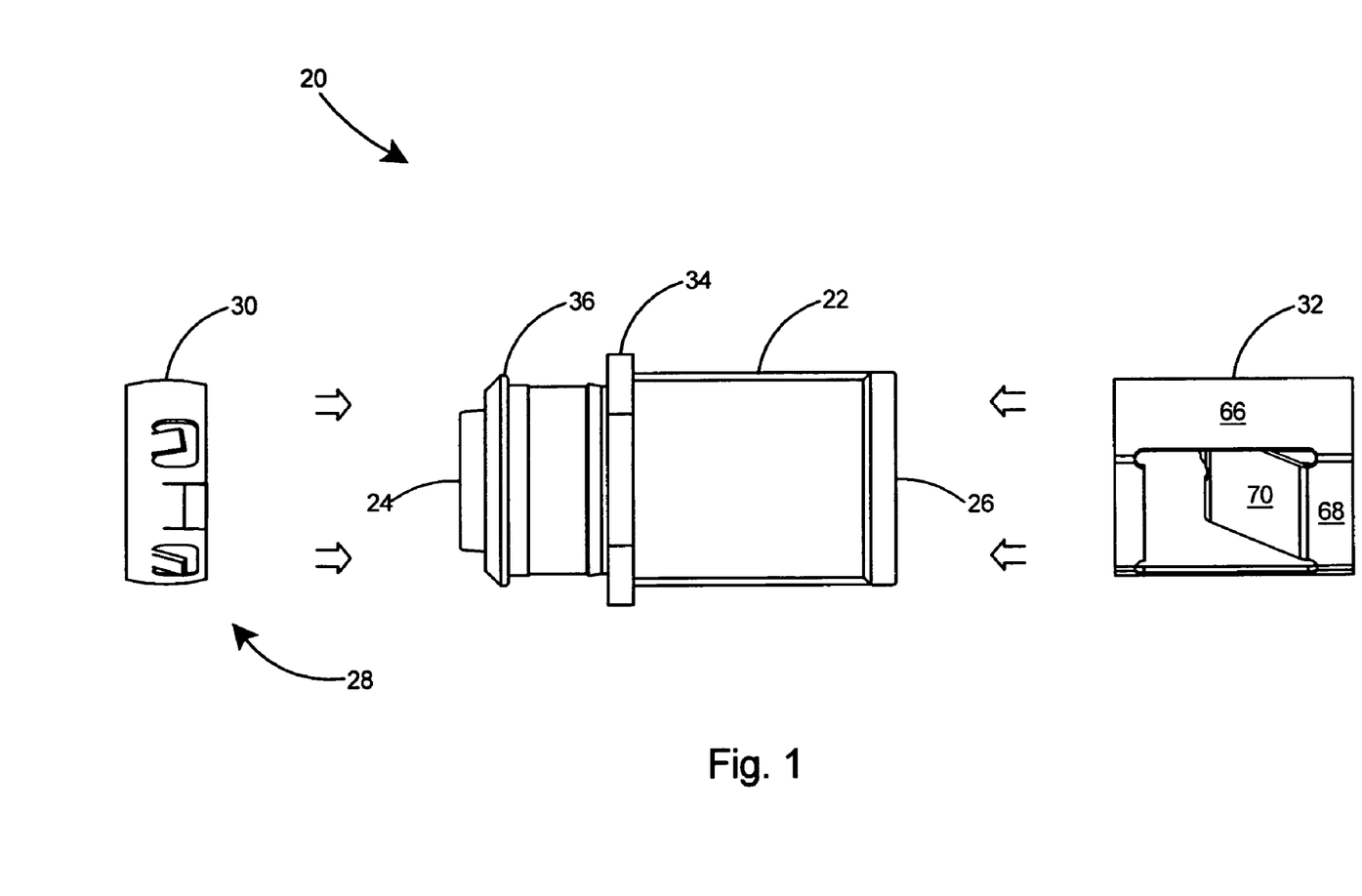
FIG. 1 is an exploded side view of the preferred embodiment of an electrical fitting according to the present invention.

With reference to FIG. 1 there is shown a preferred embodiment of the present invention, an electrical fitting 20 having an improved arrangement for the securing of electrical cables thereto. The preferred embodiment of the electrical fitting 20 includes a connector body 22 including a leading end 24 and a trailing end 26. A fastening arrangement 28 on the leading end 24 of the connector body 22 includes a cylindrical snap ring 30 for securing the connector body 22 to a panel (not shown). A cable retainer 32 is inserted within the trailing end 26 of the connector body 22 to form the electrical fitting 20 of the present invention.

Figure 2:
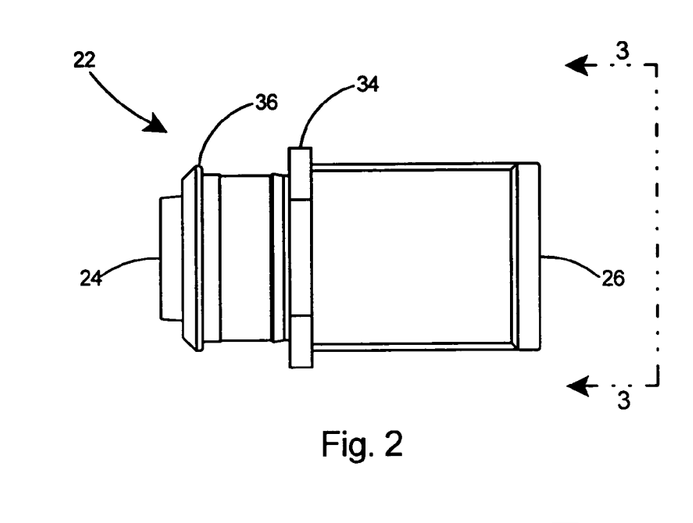
FIG. 2 is a side view of a connector body that forms a portion of the electrical fitting shown in FIG. 1.
Figure 3:
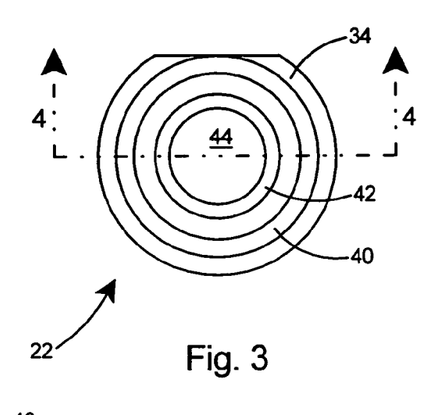
FIG. 3 is an end view of the connector body as viewed from line 3-3 of FIG. 2.
Figure 4:
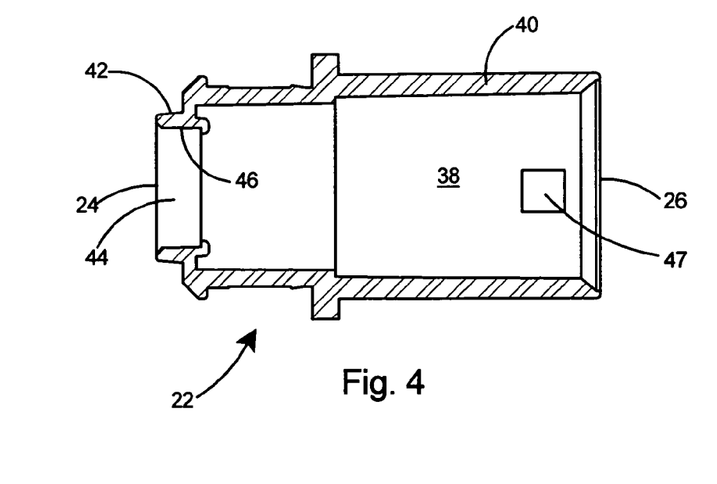
FIG. 4 is a sectional view of the connector body taken along line 4-4 of FIG. 2.

With reference to FIGS. 2-4, the connector body 22 includes a central flange 34 between the trailing end 26 and the leading end 24, an end flange 36 on the leading end 24, and a cavity 38 including a surrounding wall 40 in the trailing end 26. The connector body 22 further includes a partial closure 42 on the leading end 24, an opening 44 in the partial closure 42, and edges 46 on the partial closure 42 surrounding the opening 44. An opening 47 is provided in the surrounding wall 40 of the connector body.

Figure 5:
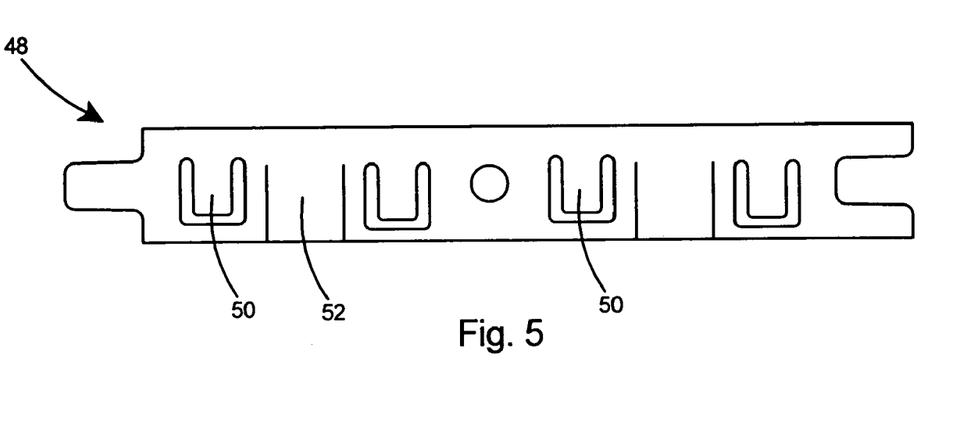
FIG. 5 is a plan view of a blank used to form a cylindrical snap ring fastening arrangement for the leading end of the connector body in FIG. 2.
Figure 6:
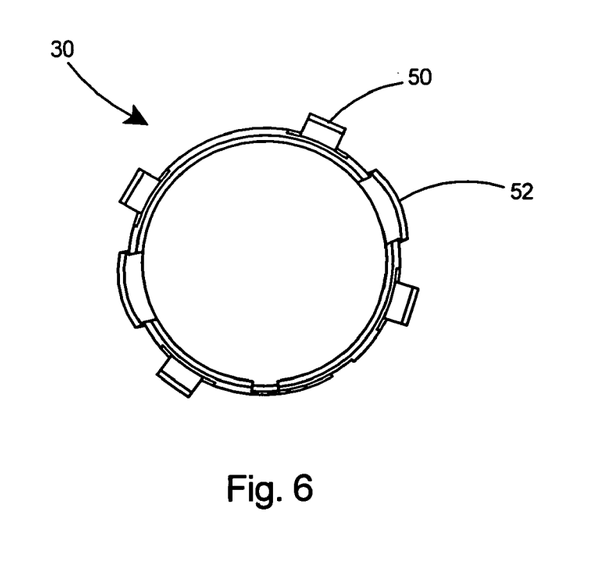
FIG. 6 is an end view of a cylindrical snap ring that has been formed from the blank of FIG. 5.
Figure 7:
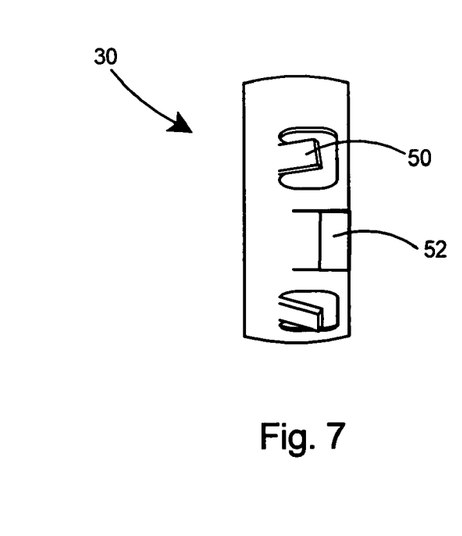
FIG. 7 is a side view of the cylindrical snap ring of FIG. 6.

Referring to FIGS. 5-7, the cylindrical snap ring 30 of the preferred embodiment is formed from a blank 48 as shown in FIG. 5 into a substantially cylindrical shape as shown in FIGS. 6 and 7. The snap ring 30 includes panel engagement tangs 50 and grounding tangs 52 bent outwards of the ring.

Figure 8:
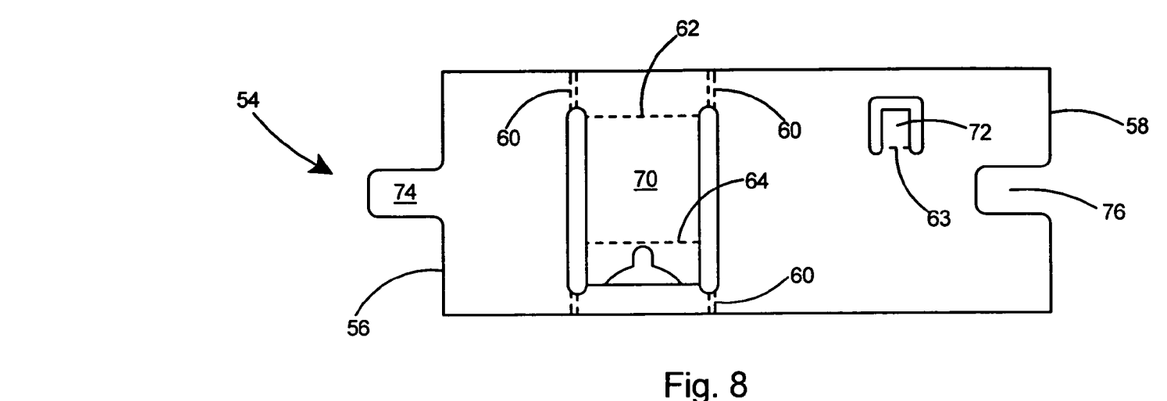
FIG. 8 is a plan view of a blank used to form a cable retainer for the trailing end of the connector body in FIG. 2.
Figure 9:
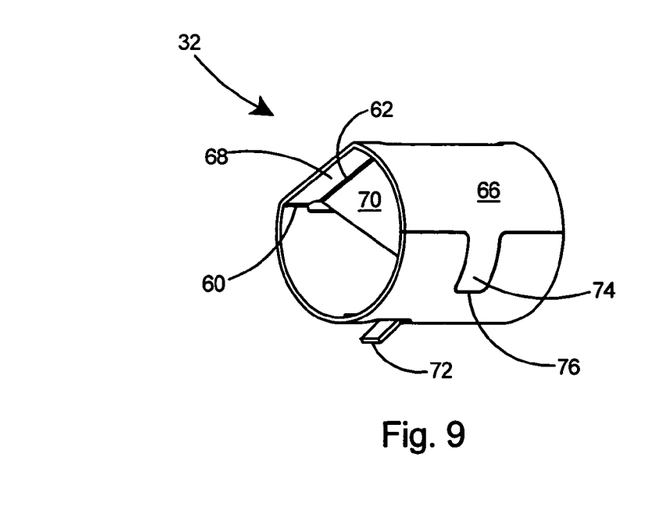
FIG. 9 is a perspective view of a cable retainer that has been formed from the blank of FIG. 8.
Figure 10:
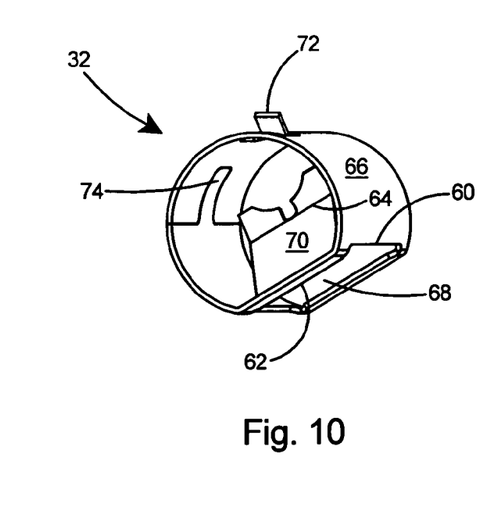
FIG. 10 is another perspective view of the cable retainer of FIG. 9.
Figure 11:
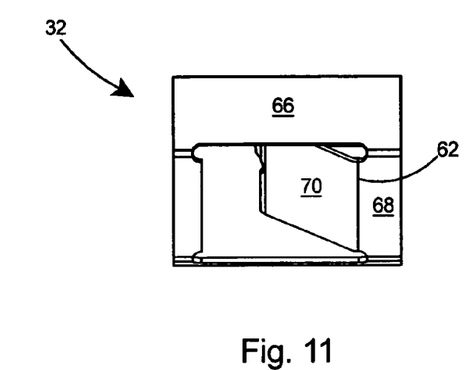
FIG. 11 is a side view of the cable retainer of FIG. 9.
Figure 12:
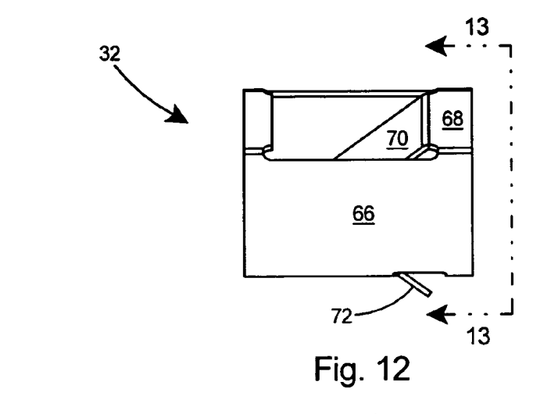
FIG. 12 is another side view of the cable retainer of FIG. 9.

The main advantages of the present invention are realized from the arrangement of the cable retainer 32 as shown in FIGS. 8-14. As shown in FIG. 8, the cable retainer 32 is formed from a flat blank 54 of spring steel having two ends 56 and 58. The blank 54 includes bend lines 60 laterally across the blank 54 and separate bend lines 62, 63, and 64 longitudinally along the blank. The blank 54 of FIG. 8 will be formed into a substantially tubular body 66 as shown in FIGS. 9 and 10 but with a flat portion 68 formed between bend lines 60. A cable retaining tang 70 is formed by bending inward of the tubular body 66 at bend line 62 and a locking tang 72 formed by bending outward of the tubular body 66 at bend line 63. The cable retaining tang 70 is bent inward a second time at bend line 64. The first end 56 of the blank 54 includes a tab 74 and the second end 58 includes a groove 76. When the blank 54 is formed into the substantially tubular cable retainer 32, as shown in FIGS. 9 and 10, the tab 74 extends into the groove 76.

Figure 13:
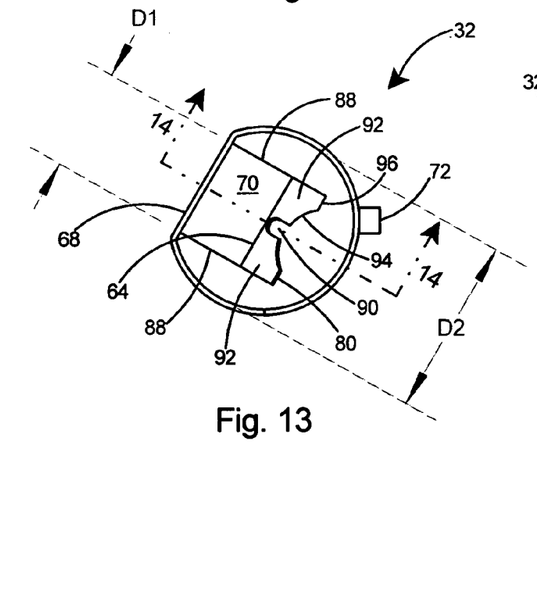
FIG. 13 is an end view of the cable retainer as viewed from line 13-13 of FIG. 12.
Figure 14:
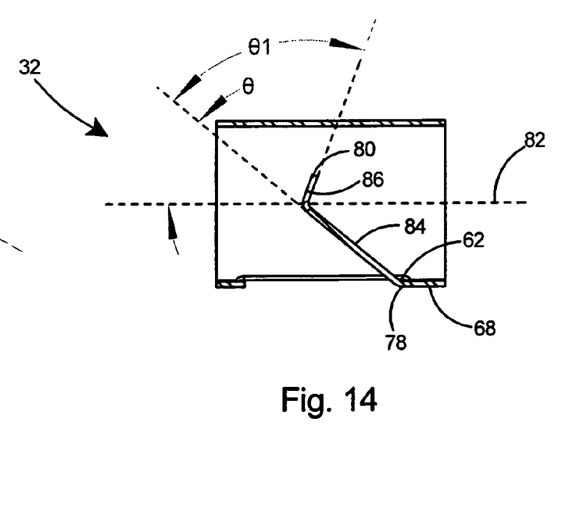
FIG. 14 is a sectional view of the cable retainer as taken along line 14-14 of FIG. 13.

With reference to FIGS. 11-14, the cable retainer 32 includes a substantially tubular body 66 with a flat portion 68, a cable retaining tang 70 projecting inward from the flat portion 68 of the tubular body 66, and a locking tang 72 projecting outward from the tubular body 66. As shown in FIG. 14, the cable retaining tang 70 includes a proximate end 78 at the juncture of the cable retaining tang 70 with the flat portion 68 and a distal end 80. A first bend line 62 at the proximate end 78 in the flat portion 68 of the tubular body 66 is a straight line as is the second bend line 64 near the distal end 80.

The tubular body 66 of the cable retainer 32 includes a longitudinal axis 82 and the first bend line 62 is at an angle θ of between 35 and 45 degrees with respect to the longitudinal axis 82. The cable retaining tang 70 includes a first leg 84 between the first bend line 62 and the second bend line 64, a second leg 86 between the second bend line 64 and the distal end 80, and the second leg 86 is bent at an angle θ1 of between 65 and 75 degrees with respect to the first leg 84. As shown in FIG. 13, the cable retaining tang 70 includes side edges 88 and a U-shaped notch 90 centered on the distal end 80. The notch 90 divides the second leg 86 of the cable retaining tang 70 into two end portions 92. The end portions 92 of the cable retaining tang 70 include an arcuate edge 94 extending from the notch 90 and a flat edge 96 extending from the arcuate edge 94 to each of the side edges 88.

Figures 15, 16, 17:
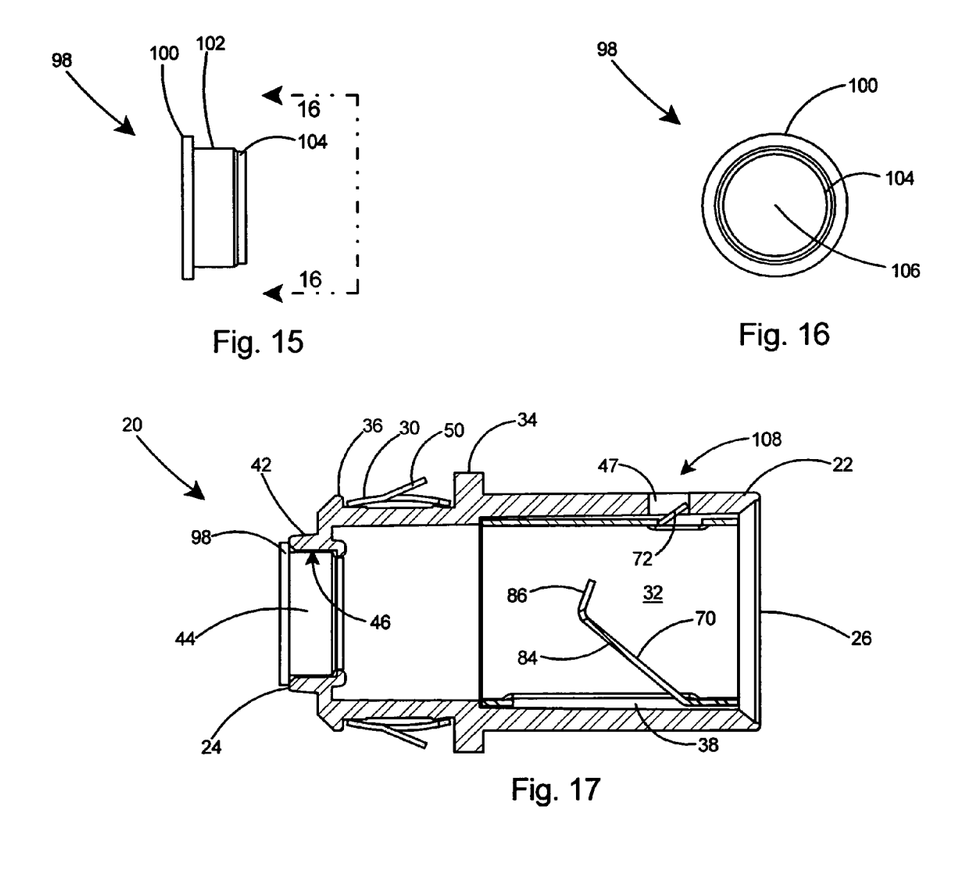
FIG. 15 is a side view of an insert that forms a portion of the electrical fitting of the present invention.
FIG. 16 is an end view of the insert as viewed from line 16-16 of FIG. 15.
FIG. 17 is a sectional view of the preferred embodiment of the electrical fitting including a cable retaining tang secured in the trailing end of the connector body and the insert of FIG. 15 inserted in the leading end of the connector body.

A tubular insert 98 which may be used with the electrical fitting of the present invention is depicted in FIGS. 15 and 16. The insert 98 includes an end flange 100, a smooth seat 102, a necked-down nose section 104, and a center bore 106. As shown in FIG. 17, the insert 98 may be pressed into the opening 44 of the partial closure 42 on the leading end 24 of the connector body 22 to substantially cover the edges 46 of the opening 44. The insert 98 acts to protect the outer sheaths of any wiring (not shown) that is later advanced through the opening 44 within the partial closure 42 of the connector body 22. The insert 98 is preferably molded of plastic.

As depicted in FIG. 17, the cable retainer 32 includes the locking tang 72 that along with the opening 47 in the trailing end 26 of the connector body 22 forms a securing arrangement 108 for locking the cable retainer 32 within the cavity 38 in the trailing end 26 of the connector body 22. As the cable retainer 32 is typically formed of spring steel and is a split ring, it can be compressed or biased inwards and inserted into the cavity 38 at the trailing end 26 of the connector body 22. The locking tang 72 of the cable retainer 32 is aligned with the opening 47 in the trailing end 26 of the connector body 22 as the cable retainer 32 is compressed and inserted therein. After the cable retainer 32 has been inserted into the cavity 38, the cable retainer 32 is released and springs outward to its unbiased shape and the locking tang 72 extends into the opening 47 in the connector body 22 thereby locking the cable retainer 32 within the cavity 38.

With reference to FIG. 17, the snap ring 30 is typically constructed of spring steel and is biased outward or expanded in size and slipped over end flange 36 until it seats on the leading end 24 of the connector body 22. Panel engagement tangs 50 extend outward from the snap ring 30.

Figure 18:
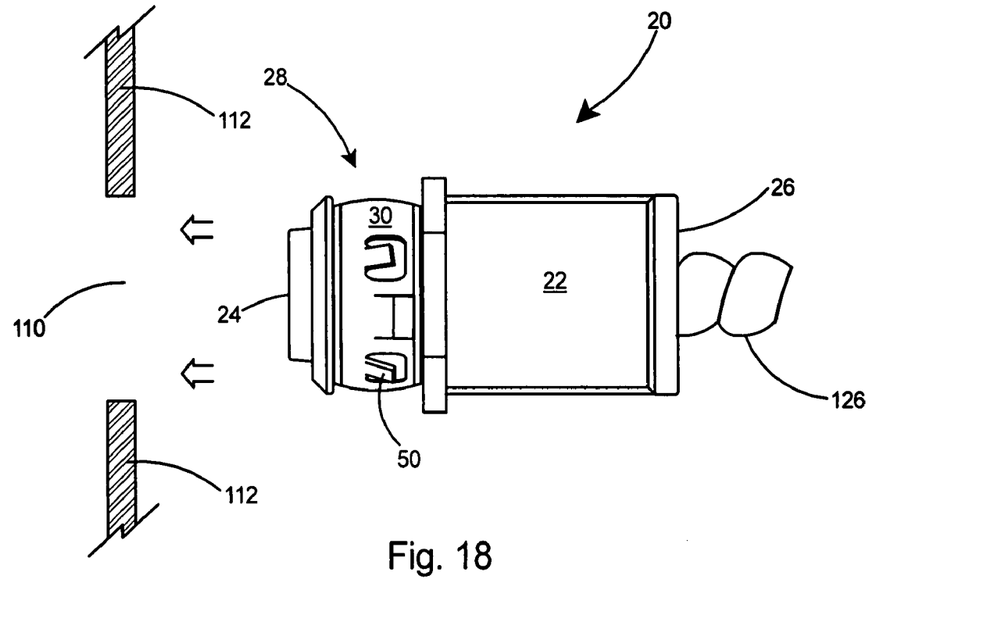
FIG. 18 is a side view of the preferred embodiment of an electrical fitting according to the present invention in alignment with a panel to which it will be snap fitted.

With reference to FIG. 18, the preferred embodiment of the electrical fitting 20 has a fastening arrangement 28 that includes a substantially cylindrical snap ring 30 on the leading end 24 of the connector body 22. The preferred embodiment of the electrical fitting 20 can be easily snapped into an aperture 110 in a panel 112 by simply pressing the leading end 24 of the connector body 22 into the aperture 110. The panel engagement tangs 50 are compressed by the panel 112 as they are pressed there through and snap outward to their unbiased position as they clear the panel 112, thereafter holding the connector body 22 securely to the panel.

Figure 19:
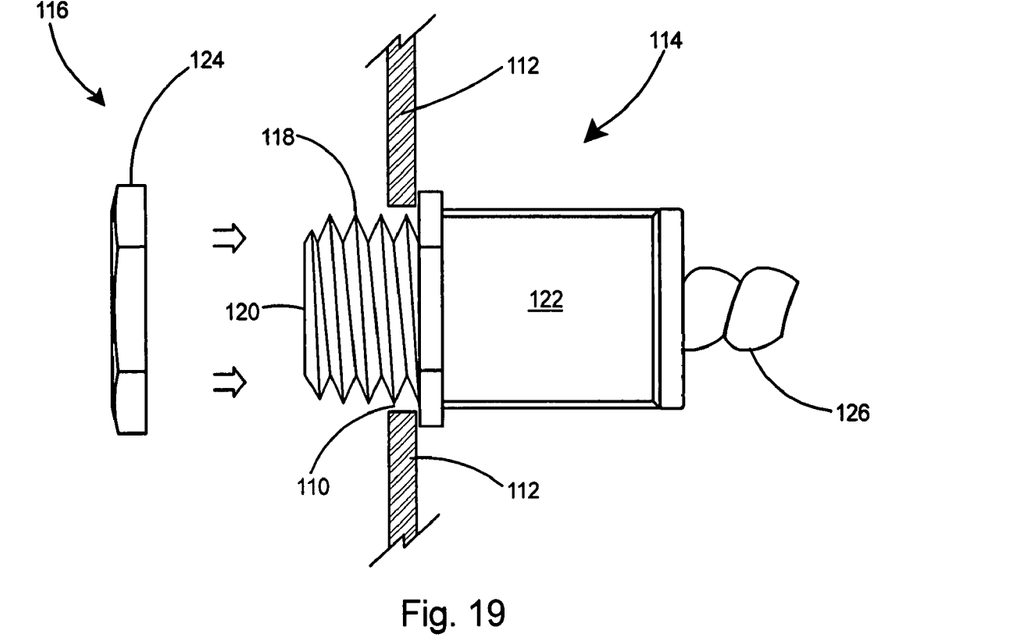
FIG. 19 is a side view of a second embodiment of an electrical fitting according to the present invention in alignment with a panel to which it will be secured by a locknut.

FIG. 19 depicts an alternative embodiment of the electrical fitting 114. The alternative embodiment of the electrical fitting 114 has a fastening arrangement 116 that includes threads 118 on the leading end 120 of the connector body 122 and a nut 124 for engaging the threads 118.

Figure 20:
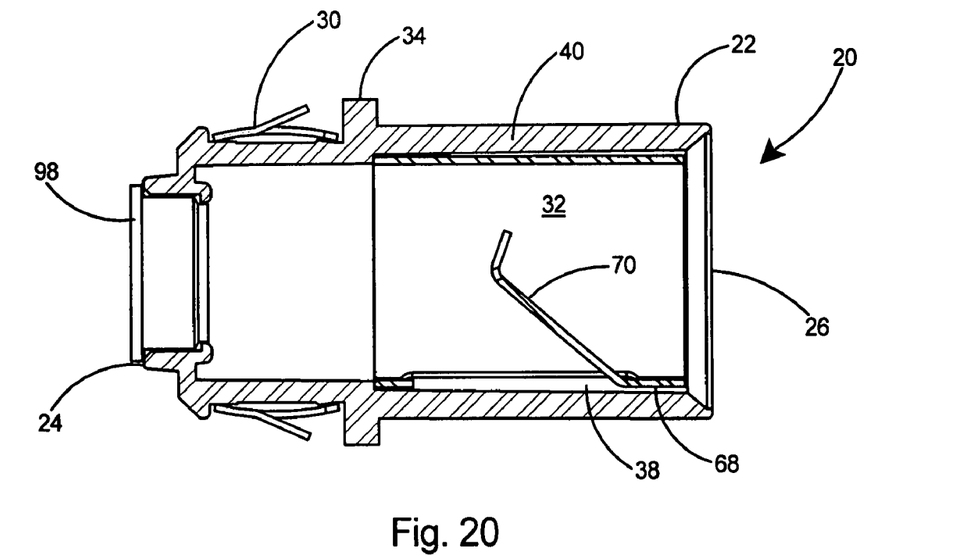
FIG. 20 is a sectional view of the preferred embodiment of the electrical fitting including a cable retainer secured in the trailing end of the connector body.
Figure 21:
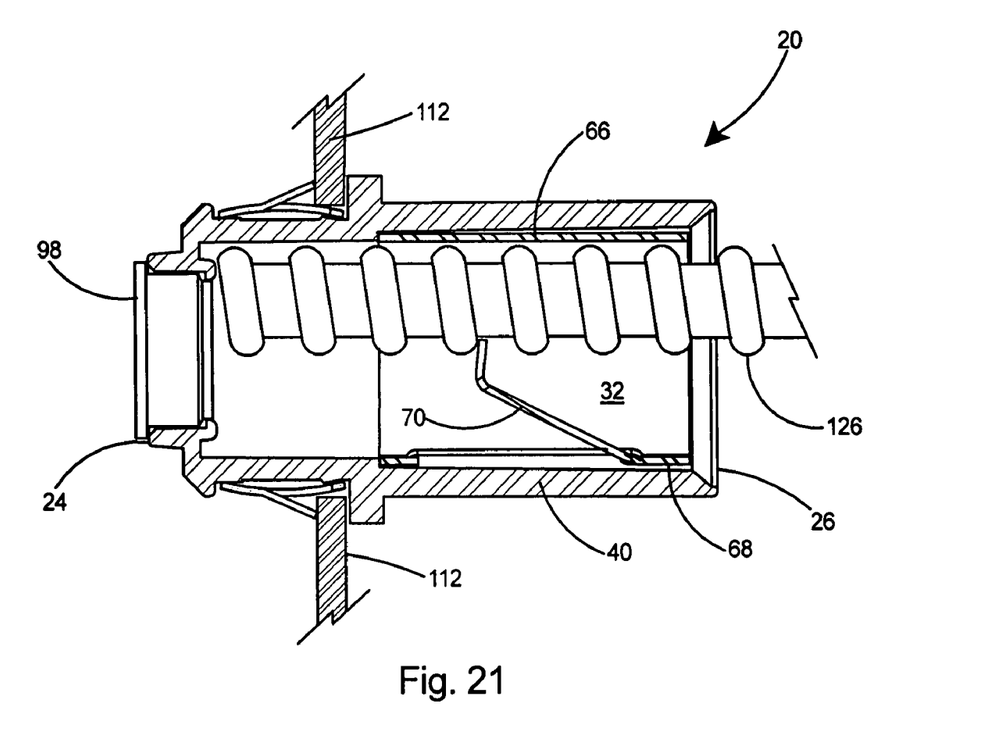
FIG. 21 is a sectional view of the electrical fitting of FIG. 17 but with a metal clad electrical cable secured and held therein in the trailing end of the connector body by the cable retainer.

Reference is made to FIGS. 20 and 21 for an understanding of the operation of a preferred embodiment of the electrical fitting 20 of the present invention. The electrical fitting 20 is provided as an assembly including the connector body 22, snap ring 30, cable retainer 32, and insert 98. With the cable retainer 32 locked into the cavity 38 at the trailing end 26 of the connector body 22, as shown in FIG. 20, the cable retaining tang 70 extends into the cavity 38 from the flat portion 68 of the cable retainer 32. After the electrical fitting 20 is connected to a panel 112, as shown in FIG. 21, an electrical cable 126 is inserted into the trailing end 26 of the fitting 20. Insertion of the electrical cable 126 biases the cable retaining tang 70 outward, thereby pressing the electrical cable 126 against the wall 40 of the connector body 22. The pressure exerted by the cable retaining tang 70 against the electrical cable 126 locks it within the connector body 22 and prevents its removal by a force applied rearward thereto to the cable.

As should be apparent from the above description with reference to the drawings, the electrical fitting of the present invention includes a cable retainer 32 that is of simplified construction, with a single cable retaining tang 70 projecting inward from the tubular body 66 of the cable retainer 32. The simplified construction enables the electrical fitting 20 to be manufactured at an economical cost. The cable retaining tang 70 of the electrical fitting 20 projects from a flat portion 68 of the cable retainer 32 and includes a straight bend line 62 (see FIG. 11) to enhance the flexibility of the tang 70 and thereby enable easy insertion of an electrical cable 126 within the trailing end 26 of the connector body 22.

With reference to FIG. 13, the single cable retaining tang 70 is of greater width and includes a wider cable gripping surface or profile, including U-shaped notch 90, arcuate edge 94 and flat edge 96, that improves the ability of the electrical fitting 20 to securely grip an electrical cable. In the preferred embodiment, the width D1 of cable retaining tang 70 is 0.375 inch and the inside diameter of the cable retainer 32 is 0.648 inch. The cable retaining tang 70 therefore spans 57% of the distance across the inner diameter of the ring. Most preferably, the cable retaining tang 70 spans at least 55% of the inner diameter of the cable retainer 32.

Preferably the connector body 22 of the present invention is constructed of metal and most preferably of Zamak™, a casting alloy comprised mainly of zinc alloyed with aluminum, magnesium, and copper and available from Eastern Alloys, Maybrook, New York. By constructing the tubular body of Zamak™ or other appropriate metals, the connector body 22 will be electrically conductive and provide good continuity throughout the fitting. The snap ring 30 and cable retainer 32 are preferably constructed of spring steel to impart toughness and flexibility to the various tangs located thereon. The insert 98 is preferably constructed of plastic and functions as an antishort bushing to prevent any electrical wires extending through the leading opening of the connector body from fraying, or becoming shorting out against the connector body. The electrical fitting 20 is used to secure an electrical cable such as metal clad (MC) cable, flex cable, or continuous corrugated MC cable to a panel.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:
1. An electrical fitting comprising:
 a connector body including a leading end and a trailing end;
 a fastening arrangement on said leading end for securing said leading end of said connector body to a panel;
 a cavity in said trailing end of said connector body, said cavity including a surrounding wall;
 a cable retainer secured within said cavity;
 a securing arrangement for locking said cable retainer within said cavity of said trailing end of said connector body;
 said cable retainer including a substantially tubular body and a cable retaining tang projecting inward from said tubular body;
 said cable retaining tang including a distal end a first leg between a first bend line and a second bend line, a second leg between said second bend line and said distal end, and said second leg is bent at an angle of between 65 and 75 degrees with respect to said first leg;
 a U-shaped notch centered on said distal end of said cable retaining tang; and
 said notch dividing said second leg of said cable retaining tang into two end portions wherein said two end portions include an arcuate edge extending from said notch and a flat edge extending from said arcuate edge to one of said side edges.

2. The electrical fitting of claim 1 wherein said tubular body of said cable retainer includes a cylindrical portion and a flat portion.

3. The electrical fitting of claim 2 wherein said cable retaining tang projects inwardly from said flat portion of said tubular body.

4. The electrical fitting of claim 2 wherein said cable retaining tang includes
   a proximate end at the juncture of said cable retaining tang with said tubular body;
   the first bend line at said proximate end, said first bend line in said flat portion of said tubular body, said first bend line is a straight line; and
   said second bend line near said distal end.

5. The electrical fitting of claim 4 wherein said cable retaining tang includes
   side edges; and
   said notch is arcuate in shape.

6. The electrical fitting of claim 5 wherein
   said tubular body of said cable retainer includes a longitudinal axis; and
   said first bend line is at an angle of between 35 and 45 degrees with respect to said longitudinal axis.

7. The electrical fitting of claim 1 wherein
   said cavity is of a smaller diameter than said cable retainer;
   said cable retainer includes an unbiased state; and
   said cable retainer in said unbiased state is of a larger diameter than said diameter of said cavity.

8. The electrical fitting of claim 1 wherein said securing arrangement for said cable retainer includes
   an opening in said wall in said trailing end of said connector body;
   a locking tang projecting outward from said cable retainer, said locking tang in alignment with said opening in said wall of said connector body; and
   an outward bias of said cable retainer against said wall of said cavity, whereby said locking tang projects through said opening of said connector body and locks said cable retainer within said cavity of said connector body.

9. The electrical fitting of claim 1 wherein
   said cable retainer is formed from a flat blank of spring steel having two ends;
   a first of said ends of said blank includes a tab;
   a second of said ends of said blank includes a groove therein; and
   said tab extends into said groove after said blank is formed into said cable retainer.

10. The electrical fitting of claim 1 wherein said connector body includes
    a central flange between said trailing end and said leading end; and
    an end flange on said leading end of said connector body.

11. The electrical fitting of claim 1 including
    a partial closure on said leading end of said connector body;
    an opening in said partial closure;
    edges on said partial closure surrounding said opening; and
    an insert in said opening, said insert substantially covering said edges of said partial closure.

12. The electrical fitting of claim 11 wherein
    said connector body is constructed of metal; and
    said insert is constructed of plastic.

13. The electrical fitting of claim 1 wherein said fastening arrangement includes a cylindrical snap ring on said leading end of said connector body.

14. The electrical fitting of claim 1 wherein said fastening arrangement includes
    threads on said leading end of said connector body; and
    a nut for engaging said threads on said leading portion.

* * * * *